Nov. 3, 1959     D. G. A. COOVER     2,910,996
IRRIGATION PIPE COUPLING
Filed March 12, 1957
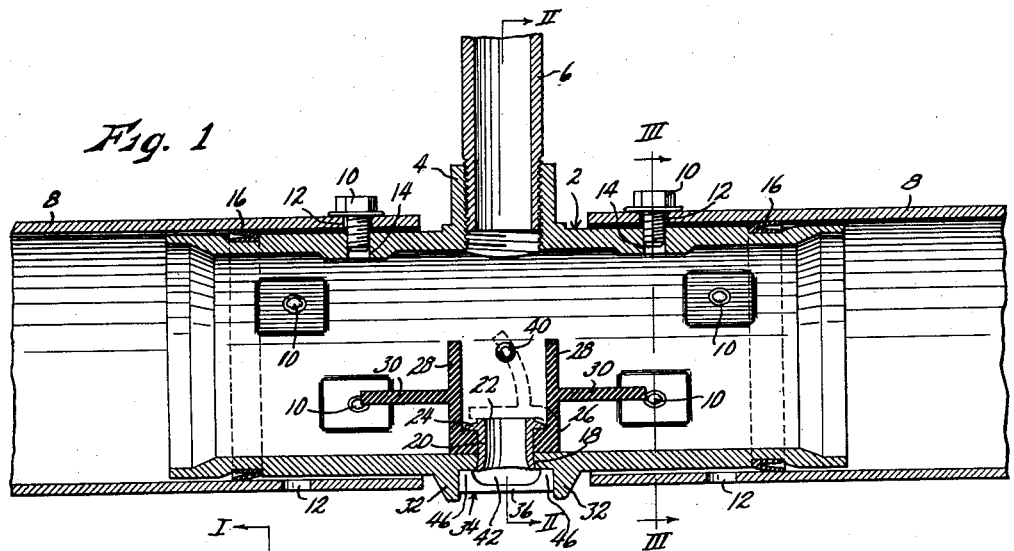
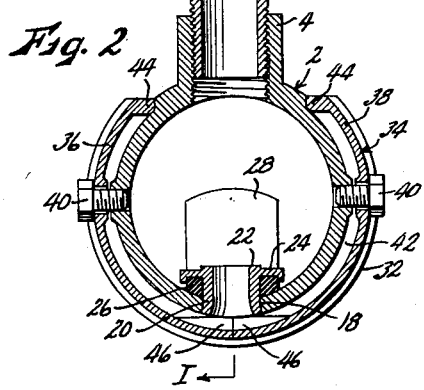
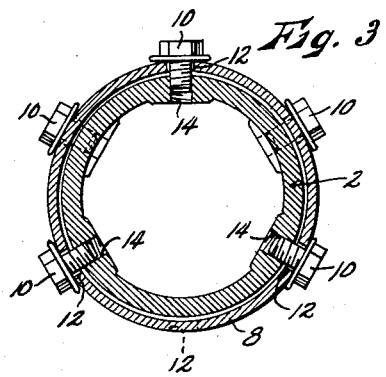
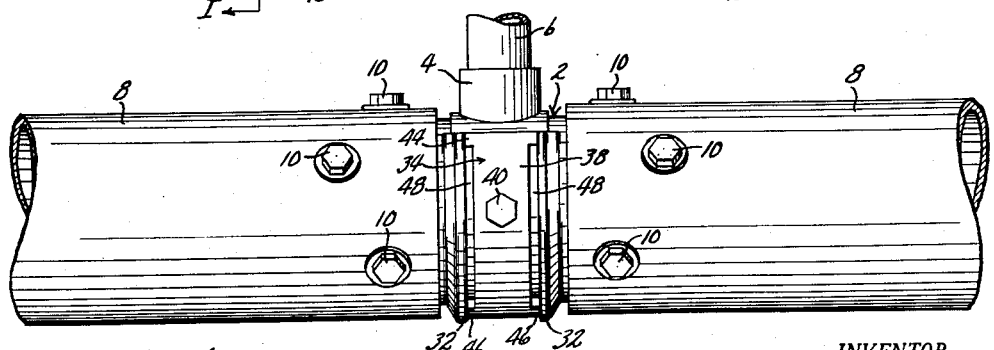
INVENTOR.
Delos G. A. Coover
BY John A. Hamilton
Attorney

United States Patent Office 2,910,996
Patented Nov. 3, 1959

2,910,996

IRRIGATION PIPE COUPLING

Delos G. A. Coover, Kinsley, Kans.

Application March 12, 1957, Serial No. 645,518

5 Claims. (Cl. 137—107)

This invention relates to new and useful improvements in irrigation equipment, and has particular reference to irrigation equipment of the portable sprinkler type. In this class of equipment, sprinkler heads are inserted at intervals into a water pipe which lies on the ground, and which is connected to a suitable supply of water under pressure. When it is desired to shift the pipe to irrigate a new area, the pipe sections either may be disassembled and transported one at a time to the new location, or the pipe may, without disassembly, be towed axially by a tractor or the like to its new location, by simply sliding it over the ground. My invention relates to the latter or "tractor-pull" type of equipment.

In tractor-pull irrigation pipes, it is desirable that the couplings between the pipe sections each be provided with a drainage valve which functions to drain the pipe in order to lighten it for easy towing. It is furthermore desirable that said drainage valves function automatically, in order to obviate the necessity of personal attendance by the operator. Valves of this general type have been proposed and used, but all of them within my knowledge have been subject to disadvantages resulting from fouling of the valve by mud, twigs, grass or the like, with the result that the valve could not close effectively during operation of the sprinklers. This of course results in a pressure drop and inefficient operation of the sprinklers, and in excessive flooding of a restricted area by water leaking through the fouled valve. Such foreign matter may be introduced into the valve either from the ground as the pipe is pulled, or in the water flowing through the pipe. Also, cleaning of the fouled valve often required disassembly of the coupling and pipes, an obviously tedious, time consuming and objectionable process.

The principal object of the present invention is, therefore, the provision of an irrigation pipe coupling fitted with an automatic drainage valve as described, in which the drainage opening is provided with novel means protecting it against fouling by twigs, grass and the like, particularly such foreign matter as might be introduced when towing the pipe along the ground, and which, when such fouling does occur, may be cleared quickly and easily without disassembly of the pipes from the coupling.

Another object is the provision, in a coupling of the character described, of novel means operable to protect the coupling and adjacent portions of the pipe sections against excessive damage by abrasion as the pipe is towed over the ground.

Other objects are simplicity and economy of construction, efficiency and dependability of operation, and adaptability for use with most types of irrigation pipe currently in use.

With these objects in view, as well as other objects which will appear in the course of the specification, reference will be had to the drawing wherein:

Fig. 1 is a longitudinal vertical mid-sectional view taken through an irrigation pipe coupling embodying the present invention, operatively interconnecting a pair of irrigation pipe sections.

Figs. 2 and 3 are sectional views taken respectively on lines II—II and III—III of Fig. 1, and Fig. 4 is an external side elevational view, slightly reduced, of the parts as shown in Fig. 1.

Like reference numerals apply to similar parts throughout the several views, and the numeral 2 applies generally to the tubular body of the coupling, said body being generally cylindrical in form and being formed preferably of aluminum, although any other suitable structural material could be used. Midway between its ends, said body is provided with an internally threaded outlet 4 into which a sprinkler pipe 6 is threaded. Said pipe extends upwardly, and it will be understood that it carries a suitable sprinkler head, not shown, at its upper end.

The contiguous end portion of a pair of sections 8 of irrigation pipe are adapted to be slipped telescopingly over the respective ends of the coupling body as shown, and to be secured thereto by a plurality of screws 10 extending through holes 12 provided in said pipe and secured into threaded holes 14 formed in body 2. These screws are equally spaced around the pipe, except that the screw which would be positioned at the bottom of the pipe, is omitted. Also no hole 14 for such screw is formed in body 2, although a hole 12 is provided in the pipe. Thus when the bottom side of the pipe becomes worn or abraded by sliding contact with the ground, screws 10 may be removed, the pipe turned axially with respect to the coupling body to bring a different section of the pipe wall into contact with the ground, and screws 10 reinserted. Experience has shown that the major portion of such pipe wear occurs directly at and adjacent the couplings. It will be understood that the couplings must be maintained upright to insure that sprinkler pipes 6 extend upwardly, and that ordinarily this function is performed by outrigger runners or the like, not shown, attached at intervals to pipe sections 8. Adjacent each end of body 2, an external peripheral groove is formed therein and carries a rubber sealing ring 16. Said sealing rings are of a type expandable by water pressure to engage tightly the internal walls of pipes 8, whereby to prevent leakage of water between said pipes and body. The threads of screws 10 may also be treated with a suitable pipe compound to prevent leakage of water therearound.

Diametrically opposite sprinkler pipe 6, at the bottom of body 2, a drainage opening 18 is formed in said body, and a tubular member 20 is fixed at its lower end in said opening, extending upwardly into the interior of the coupling body. At its upper end, member 20 forms a valve seat 22, and said member is also provided at its upper end with an enlarged planar head 24. Clamped between said head and the internal surface of body 2 is a soft rubber valve member 26 including a pair of planar flaps 28 spaced apart longitudinally of the coupling and disposed respectively at opposite sides of valve seat 22. The planes of said flaps are normally at right angles to the axis of the coupling, as shown in solid lines in Fig. 1, and they extend vertically to points well above valve seat 22. On their distal sides, flaps 28 are each provided with an integral rubber vane 30 which normally extends parallel to the coupling axis. The resilience of flaps 28 normally holds them in the position shown in solid lines in Fig. 1, leaving valve seat open. When water is fed through the pipe in either direction, the velocity and pressure of said water against the flaps will cause one or the other of said flaps to bend over and close valve seat 22, as shown in dotted lines in Fig. 1, vane 30 of said flap also serving to assist in the closing of the valve. The drainage opening is thus sealed and the water must flow upwardly through the sprinkler pipe 6. When the water is shut off, flaps 28 will recover resiliently to open the valve, and water remaining in the pipe will be drained to the ground, for the purpose already discussed.

Externally of the coupling, a pair of peripherally extending ribs 32 are formed integrally with the body, said ribs being spaced apart axially of the coupling a distance greater than the diameter of drainage opening 18 and equally spaced at opposite sides of said opening, but being disposed entirely between the contiguous ends of pipe sections 8. Said ribs extend around all but the uppermost portion of the coupling body. The space between ribs 32 is occupied by a protective guard ring 34 of an angular extent equal to that of said ribs. Said ring is split at the bottom of the coupling into two sections 36 and 38, each of said sections being releasably secured to body 2 by a screw 40 extending through said ring section and threaded into the body. The threads of said screws may be treated with a pipe compound to prevent leakage of water therearound.

Ring 34 completely covers drainage opening 18. However, each of the sections 36 and 38 of said ring are spaced outwardly from the body, whereby to form an annular chamber 42 therebetween, by a pad 44 formed integrally therewith at the upper end thereof (see Fig. 2), and a pair of pads 46 formed integrally therewith at the lower end thereof, all of said pads engaging the coupling body to hold the main portions of said ring sections in outwardly spaced relation from said body. The lower pads 46 of each ring section are spaced apart axially of the ring (see Fig. 1) in order not to obstruct the drainage opening. Also, as best shown in Fig. 4, ring sections 36 and 38 are for the most part narrower than the space between body ribs 32, in order to leave water passages 48 between said ribs and the edges of said rings. The pad portions 44 and 46 respectively at the upper and lower ends of each ring section are widened to fit snugly between ribs 32, to maintain the ring sections centered between the ribs.

It will thus be seen that water in draining from the coupling must follow a rather devious path, passing first through tubular valve member 20 and impinging against the interior surface of ring 34, then following annular chamber 42 in one direction or the other until it can pass outwardly through passages 48. For this reason, it is very unlikely that twigs, grass, weeds, mud or the like could be worked into the valve to such an extent as to prevent the effective closure of valve flaps 28 against seat 22. However, in the event such fouling should occur, the foreign matter either working its way into the valve through the devious passages just described as the pipe is pulled over the ground, or being carried into the valve by the water itself, it is very simple to remove the guard ring 34 by removing the two bolts 40, then introducing a finger or other member into the tubular valve body 20 to clear valve seat 22 of obstructions. No disassembly of pipes 8 from the coupling is required. The outlet passages 48 are quite long, and it is therefore quite unlikely that enough of the length thereof could be plugged by mud or clay to prevent effective draining of the pipe. The fact that ribs 32 are of a greater diameter than ring 34 also assists in keeping passages 48 open. Said ribs also protect ring 34 against wear and abrasion against the ground. It will be noted also that these ribs have a diameter greater than that of pipes 8, and therefore tend also to protect the pipes themselves against such wear and abrasion, at least at and adjacent the ends thereof, where such wear most commonly is concentrated.

While I have shown and described a specific embodiment of my invention, it will be apparent that many minor modifications of structure and operation could be made without departing from the spirit of the invention as defined by the scope of the appended claims.

What I claim as new and desire to protect by Letters Patent is:

1. An irrigation pipe coupling comprising a tubular body adapted to be disposed generally horizontally and to receive the contiguous end portions of a pair of pipes telescopingly over the respective end portions thereof, means for securing said pipes to said body with the opposing ends of said pipes in spaced relation, whereby a portion of said body is left exposed, said body having a bottom drain opening formed in the portion thereof thus exposed, and a normally open valve mounted in said body and operable to close said opening responsively to the pressure and velocity of water flowing through said coupling, said body being provided with a pair of circumferentially extending external ribs within the portion thereof exposed between the ends of said pipes, said ribs being disposed respectively at opposite sides of said drain opening, whereby to protect said opening against the entry of foreign matter as said pipes are pulled over the ground in a direction parallel to their axis, said ribs having an external diameter greater than that of said pipes, whereby to protect the adjacent portions of said pipes against abrasion as said pipes are pulled over the ground.

2. An irrigation pipe coupling comprising a tubular body adapted to be disposed generally horizontally and to receive the contiguous end portions of a pair of pipes telescopingly over the respective end portions thereof, means for securing said pipes to said body with the opposing ends of said pipes in spaced relation, whereby a portion of said body is left exposed, said body having a bottom drain opening formed in the portion thereof thus exposed, a normally open valve mounted in said body and operable to close said opening responsively to the pressure and velocity of water flowing through said coupling, said body being provided with a pair of circumferentially extending external ribs within the portion thereof exposed between the ends of said pipes, said ribs being disposed respectively at opposite sides of said drain opening, and a guard ring secured releasably to said body and partially encircling said body within the space between said ribs so as to overlap said drain opening, the principal portion of said ring being spaced radially outwardly from said body to form an annular chamber therebetween communicating with said opening, and being narrower than the space between said ribs to provide passages between said ring and said ribs, said last named passages being of substantial angular length whereby to minimize the possibility of plugging thereof by mud or other foreign matter.

3. An irrigation pipe coupling comprising a tubular body adapted to be disposed generally horizontally and to receive the contiguous end portions of a pair of pipes telescopingly over the respective end portions thereof, means for securing said pipes to said body with the opposing ends of said pipes in spaced relation, whereby a portion of said body is left exposed, said body having a bottom drain opening formed in the portion thereof thus exposed, a normally open valve mounted in said body and operable to close said opening responsively to the pressure and velocity of water flowing through said coupling, said body being provided with a pair of circumferentially extending external ribs within the portion thereof exposed between the ends of said pipes, said ribs being disposed respectively at opposite sides of said drain opening, and a guard ring secured releasably to said body and partially encircling said body within the space between said ribs so as to overlap said drain opening, the principal portion of said ring being spaced radially outwardly from said body to form an annular chamber therebetween communicating with said opening, and being narrower than the space between said ribs to provide passages between said ring and said ribs, the diameter of said ribs being greater than the external diameter of said guard ring, whereby to minimize the possibility of the plugging of said last named passages by mud or other foreign matter.

4. An irrigation pipe coupling as recited in claim 2 wherein the external diameter of said ribs is greater than the external diameter of said guard ring.

5. An irrigation pipe coupling comprising a tubular body adapted to be disposed generally horizontally and to receive the contiguous end portions of a pair of pipes telescopingly over the respective end portions thereof, means for securing said pipes to said body with the opposing ends of said pipes in spaced relation, whereby a portion of said body is left exposed, said body having a bottom drain opening formed in the portion thereof thus exposed, a normally open valve mounted in said body and operable to close said opening responsively to the pressure and velocity of water flowing through said coupling, said body being provided with a pair of circumferentially extending external ribs within the portion thereof exposed between the ends of said pipes, said ribs being disposed respectively at opposite sides of said drain opening, and a guard ring secured releasably to said body and partially encircling said body within the space between said ribs so as to overlap said drain opening, the principal portion of said ring being spaced radially outwardly from said body to form an annular chamber therebetween communicating with said opening, and being narrower than the space between said ribs to provide passages between said ring and said ribs, that portion of said guard ring overlapping and immediately adjacent said drain opening being of such width as to fit snugly between said ribs, whereby water draining from said opening is forced to flow through at least a portion of said annular chamber before emerging through said last named passages.

References Cited in the file of this patent

UNITED STATES PATENTS

| | | |
|---|---|---|
| 1,881,717 | Lawrence et al. | Oct. 11, 1932 |
| 2,541,208 | Cornelius | Feb. 13, 1951 |
| 2,561,296 | Stout | July 17, 1951 |
| 2,727,761 | Elliot et al. | Dec. 20, 1955 |